| United States Patent [19]
Gianola et al.

[11] Patent Number: 4,939,727
[45] Date of Patent: Jul. 3, 1990

[54] ASSOCIATED MEMORY COMPUTER WITH FLOATING NON-WIRED CELLS

[75] Inventors: Umberto F. Gianola, Vero Beach, Fla.; Allen L. Gorin, Fairlawn, N.J.

[73] Assignee: AT&T Bell Laboratories, Murray Hill, N.J.

[21] Appl. No.: 292,586

[22] Filed: Dec. 30, 1988

[51] Int. Cl.$^5$ .............................................. H04J 3/24
[52] U.S. Cl. .................................................. 370/94.1
[58] Field of Search ................... 370/94, 92, 60, 94.1; 364/133; 340/825.52

[56] References Cited

U.S. PATENT DOCUMENTS 4,430,651  2/1984  Bryant et al. ........................ 370/94
4,742,516  5/1988  Yamaguchi .......................... 370/94

Primary Examiner—Douglas W. Olms
Assistant Examiner—Melvin Marcelo
Attorney, Agent, or Firm—Charles E. Graves

[57] ABSTRACT

The present multiprocessor computing architecture uses a Host device to communicate directly with each processor of an array. The processors are identical, but initially unindividuated. Each is capable of generating on command an identification indicia, expressable as a number. Using the set of such numbers, the Host executes an interactive initialization protocol, through which each processor assumes a digitially coded address or label related to its generated number. The label thereafter is used by the Host to transmit data or to order data from the so-identified element. One Host-processor configuration uses direct broadcast for communications and, therefore, is not reliant on conventional physical, that is hard-wired, paths. Need to place individual processors in particular locations with respect to one another, or in a predetermined configuration such as a tree, is obviated.

9 Claims, 7 Drawing Sheets

FIG. 10
BROADCAST RESOLVE, REPORT PROCESS

ASSOCIATED MEMORY COMPUTER WITH FLOATING NON-WIRED CELLS

FIELD OF THE INVENTION

This invention relates to multiprocessor computing architectures, and in particular to parallel computing processes and structures.

BACKGROUND OF THE INVENTION

Parallel computing involves the concurrent execution in separate processing elements of several computations under a central control. For certain classes of problems, parallel processing not only increases computation speed markedly, but also provides a means of processing problems for which only real-time solutions are useful.

The communications protocols in parallel computing must facilitate the transmission of data and computation instructions from a Host to each of a large numbers of processor elements or cells, and the reporting back to the Host by each cell of the computation results. Typically, the Host allocates different computational tasks to different individual cells. Therefore, the Host requires a way to associate a given cell report with a particular assigned computational task.

In many parallel processing architectures of the prior art, however, such as, for example, binary tree architectures, the communications protocols which enable the Host to know the identity of each cell need involve many other cells. Thus, if a given cell in the tree architecture were to fail, communications to and through the failed cell would be interrupted, and the functionality of the overall architecture could be impaired.

Pattern recognition is one type of computational problem for which parallel processing has important applications. Pattern recognition is a collection of techniques for sensing data representative of an unknown pattern, and determining which pattern within a large reference set of different known patterns constitutes the closest match to the unknown pattern.

Pattern recognition techniques apply, for example, to speech and speaker recognition; robotic vision; optical character recognition; the classification of acoustic, optical or other electromagnetic emissions from submarines, ships, land vehicles, aircraft, and spacecraft in order to uniquely identify the emitter and platform; and the identification of specific data or images transmitted over a particular communications channel or channels.

In parallel pattern recognition processes, a known set of signal patterns are digitally expressed and then individually stored at respective ones of the processor elements as a library of reference patterns. An incoming signal to be identified is converted to a digital signal pattern, which is then transmitted to the processor elements in predetermined fashion for comparison to each of the known patterns of the reference library. The value of each comparison constitutes a measure of the similarity, or correlation, of the unknown pattern to each of the stored, known patterns.

In complex problems, the pattern set is constituted as a collection of primitive pattern elements, with rules for "gluing" the elements together into structural patterns. This technique is used in speech recognition, where the reference library consists of sentences or sentence segments defined individually as grammatically correct sequences of words. A sequence of unknown incoming speech patterns are matched against the library reference patterns of permissible sentence segments. The measures of similarity are calculated at each processor node in the architecture. Then, under the control of the Host, the closest match is identified and displayed for a viewer or used in further processing.

In the field of speech pattern recognition, the number of grammatically permissible speech segments is so large, that the necessary computations cannot be executed in real time even using high-performance computers of conventional design such as a Cray. Parallel processing is a possible solution; but the number of processor elements required to achieve the needed pattern-matching must be correspondingly large in order to provide the necessary system processing rate on the order of 100 GigaFLOPS. In other fields, where the input signal has yet higher bandwidth such as optical or electromagnetic, TeraFLOP computation can be required.

The advent of relatively low-cost digital processor chips makes it economically feasible to construct a parallel processor which can achieve the necessary pattern comparisons in real time. The problem, however, as with any machine relying on large numbers of critical performance elements, is that failure of one element can render the machine incapable of performing to its designed level. In a typical hard-wired binary tree architecture parallel processing arrangement, for example, if one processing element fails, its descendent subtree structure is disconnected from the rest of the tree. The result will be decreased reliability and increased operating cost.

Current techniques for achieving tolerance to chip or node failures in large multiprocessor machines, add unduly to the machine's physical volume, heat generation and expense. The lack of an effective solution to fault occurrences becomes more critical as the number of processing elements grows; and this in turn limits the system designer's ability to meet the requirements of computationally intensive pattern recognition applications.

A second problem for multiprocessor computer architectures, however, and one that is not directly related to fault tolerance, is that the sheer volume of the aggregate processor configuration in computers with TeraFLOP power, makes difficult the distribution of control signals to the individual processor elements. This deficiency, in fact, is endemic to many high bandwidth systems that are both fully electronic and physically large.

OBJECTS OF THE INVENTION

Accordingly, one object of the invention is to provide a parallel computer architecture in which the assembly of individual processor elements need not be connected through hard wiring paths, no matter how many elements are used.

Another object of the invention is to define an operational protocol for imparting a unique signaling capability to and from a Host and each processor element, which is independent of processor location.

Another object of the invention is to create a parallel computer which is highly tolerant to faults in one or several of the individual processor elements of the assembly.

A further object of the invention is to provide an economical technology for addressing computational problems in which the computational throughput is in the order of TeraFLOPS.

SUMMARY OF THE INVENTION

The present invention broadly contemplates a Host device communicating directly, through a unique protocol, with individual members of an assembly of large numbers of identical but initially unindividuated processor elements. The protocol imparts to each processor element a digitally coded address or label, which can thereafter be employed by the Host for purposes of transmitting data to or ordering data to be transmitted from an element having that label.

Once the individual members within the assembly have been so labeled, the Host imparts to each labeled element a discrete associated data and instruction set. The instructions to each cell contain both computation and reporting procedures to be followed upon command from the Host. The assigned labels enable the Host to subsequently associate the processing results in a given cell with the particular data sent to that processor element.

For a representative application, the Host controls the operations of the individualized processor elements by addressing to each element essentially the same computation task but different data and reporting instructions. The reporting instructions contain means for causing only those elements containing the desired or needed information to communicate back to the Host. The computation tasks associated with each processor element may be changed by the Host, should the application require such change.

The individual labeling and information reporting capabilities are achieved, pursuant to one aspect of the invention, by a physical configuration which in one embodiment uses broadcast and, therefore, is not reliant on conventional electrical hard wired paths. This embodiment has the further advantage of not requiring the placement of individual elements in any particular location with respect to one another, or in a predetermined configuration such as a tree.

More specifically, the invention provides Host-to-cell communications through signals transmitted either by electromagnetic broadcast and reception including operation in the optical range. Alternatively, use of discrete optical media in one embodiment is contemplated.

In a particular hardware arrangement, the elements are identical in their input-output and processing capabilities. Since the elements each communicate directly with the Host instead of through intervening elements, the elements may be disposed in relation to each other in a novel and advantageous manner. In this embodiment, the elements are not constrained to reside in their containment medium in a particular geometric pattern. It is necessary only that each element be positioned within the zone in which Host-to-cell transmission and reception is possible.

The element containment medium of this embodiment is exemplified by a stationary two-dimensional mounting board disposed optimally within the transmission cone of a Host optical transceiver.

The Host-cell array as generally described above, provides tolerance to element faults at little cost and virtually no additional complexity. The need to prescreen individual elements before use in the array is greatly reduced, as is the need for exhaustive testing of the array before each application.

This important advantage not only provides an economic benefit, but also makes the present invention particularly well-suited for use in real-time, parallel searching of highly partitioned data files where high importance is placed on reliability. The reliability is achieved by identifying in the initialization process, any element which fails to meet a selected reliability test. The elements so identified are not assigned labels and, thus, are ignored in later operations.

Not utilizing a cell causes no loss of functionality with respect to any of the other cells, because the cells are not serially interconnected. Further, not utilizing a cell because of a cell defect does not require a reconfiguration of any of the remaining cells.

The invention is fully set forth in the description to follow of an illustrative embodiment.

DETAILED DESCRIPTION OF AN ILLUSTRATIVE EMBODIMENT

General structural components for practicing the invention will first be described.

Figure 1:
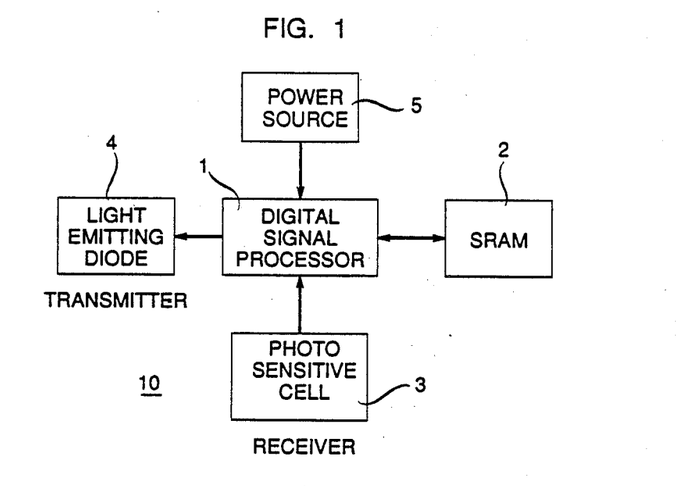
FIG. 1 is functional block diagram of a computing node embodying the invention.

A high-level functional diagram of a computing node or element is provided in FIG. 1. The element 10 includes a digital signal processor 1, which can be commercially available AT&T DSP 32C microprocessor. Element 10 also includes a memory 2, which may be a commercially available SRAM. An optical receiver 3; an optical transmitter 4; and a power source 5 complete the basic components of element 10. The transmitter 3 and receiver 4 will be detailed further below. Means such as photovoltaic device, or conventional power busses within the element containment medium, may be provided to power the assembly.

Figure 2:
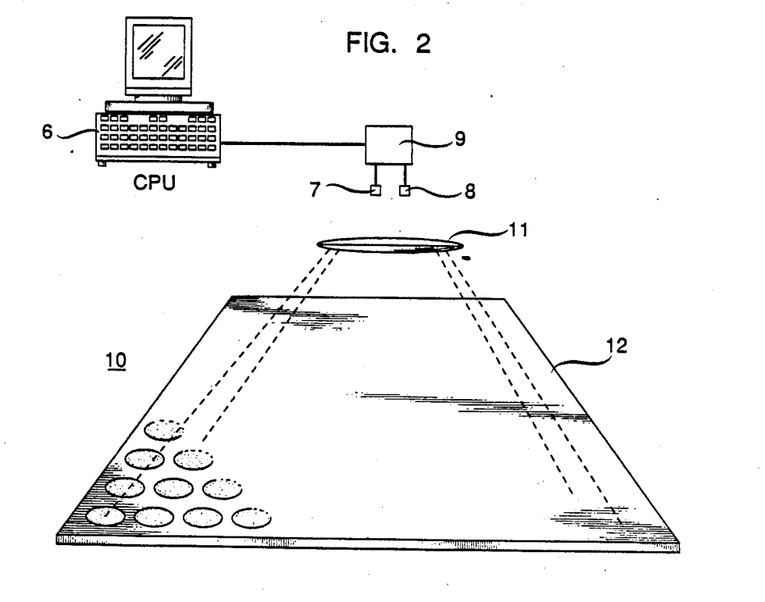
FIG. 2 is a schematic diagram of a physical arrangement for the nodes and a Host.

FIG. 2 shows schematically the hardware elements of a first embodiment, and their communications paths. A Host computer, denoted 6, initializes the cell array, and communicates instructions on the computations to be performed and the reports to be made by each element 10. The Host 6 can be an AT&T PC6300+.

In the FIG. 2 embodiment, the signals between the elements and the controller are broadcast. Host 6 communicates with the elements through a controller 9, which includes an optical transmitter 7 and an optical receiver 8, both located at the focal point of a lens 11. The elements 10 in the instant embodiment are arrayed on a medium, such as a planar surface 12. Their position with respect to the broadcast signal source is selected mainly to contain the elements within the transmit-receive cone angle of the lens 11. This angle should be as small as possible. In this embodiment, the elements 10 can be distributed in any way selected by the designer, including random positionings.

The AT&T DSP32C includes conventional registers and gates (not shown). The registers of the DSP32C store data transmitted by the Host 6, including call sign and instruction sets. The gates of the DSP32C process receive and stored data according to both received and stored instructions.

For each of the separate process steps, communications between the Host and each individual cell may if desired be effected through a separate allocated optical channel; i.e., channels separated in band may be conventionally provided for: call-sign insertion or generation (channel 1); cell individualization (channel 2); cell-to-Host transmission for identification and similarity measure transmission to Host (channel 3); and Host-to-cell broadcast of unknown patterns and processing-/communication instructions. (channel 4). These conventional channel allocations are well-known and are not shown.

Figure 3:
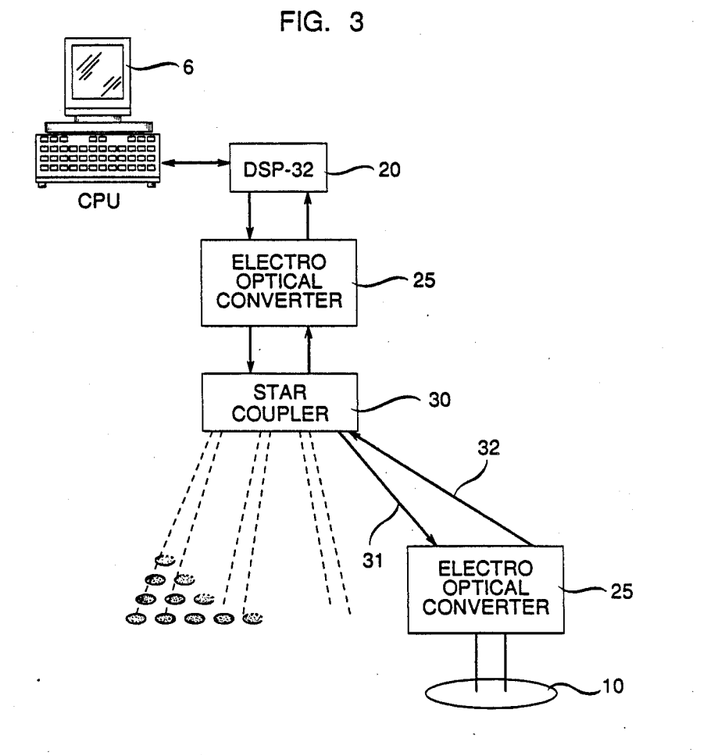
FIG. 3 is a block diagram of a further physical arrangement connecting the computing nodes and a Host.
Figure 4:
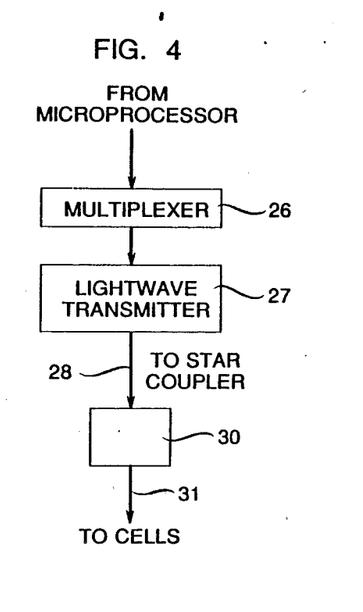
FIGS. 4 and 5 are block diagrams of communications paths for practicing the invention.
Figure 5:
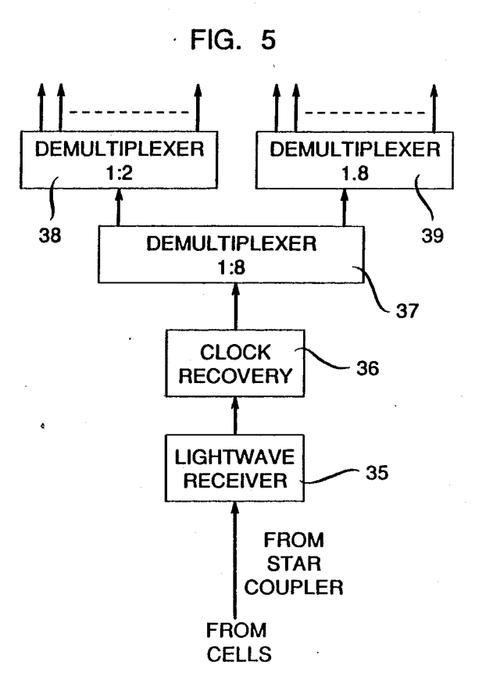
Figure 6:
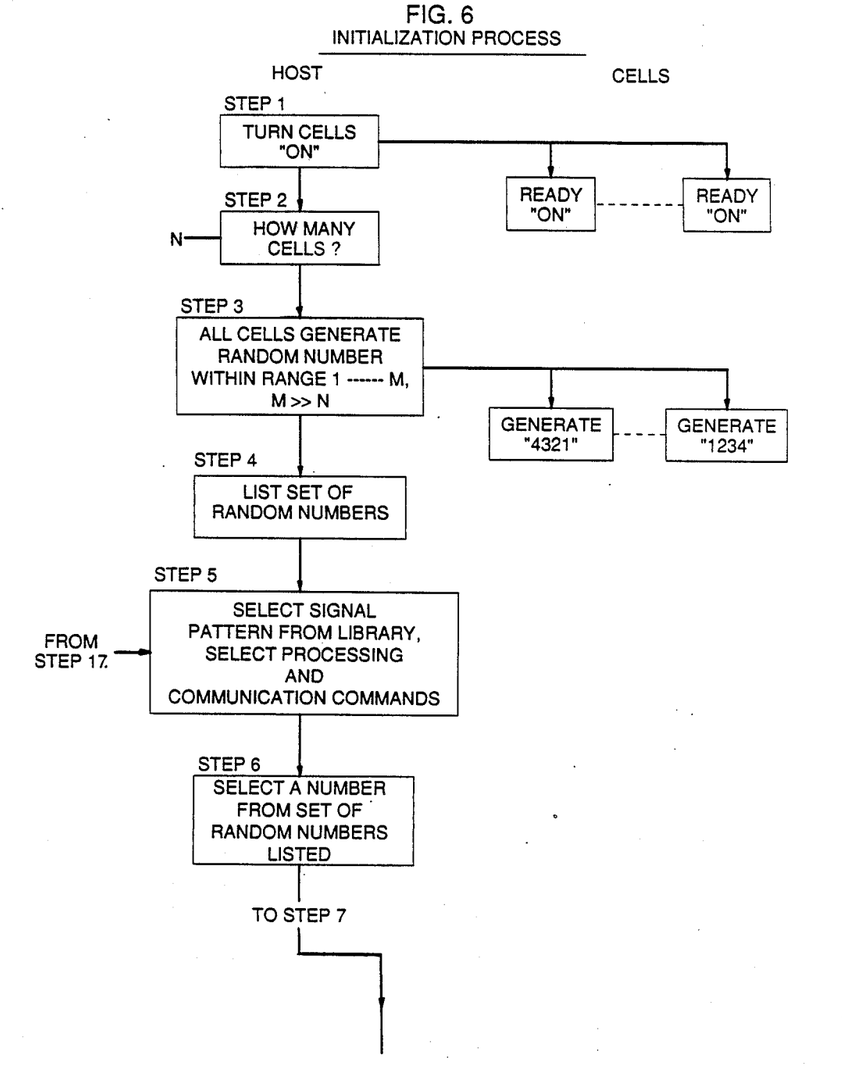
FIGS. 6–10 are process diagrams.
Figure 7:
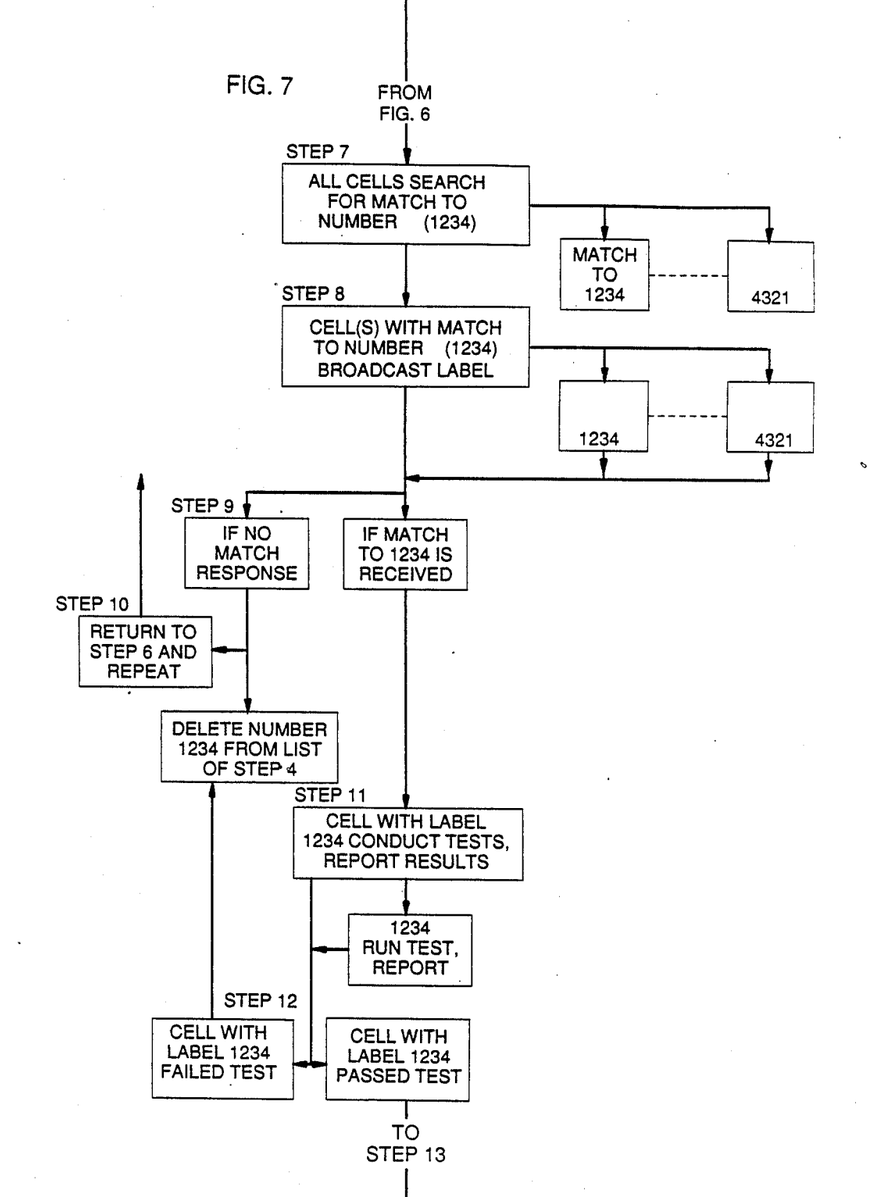
Figure 8:
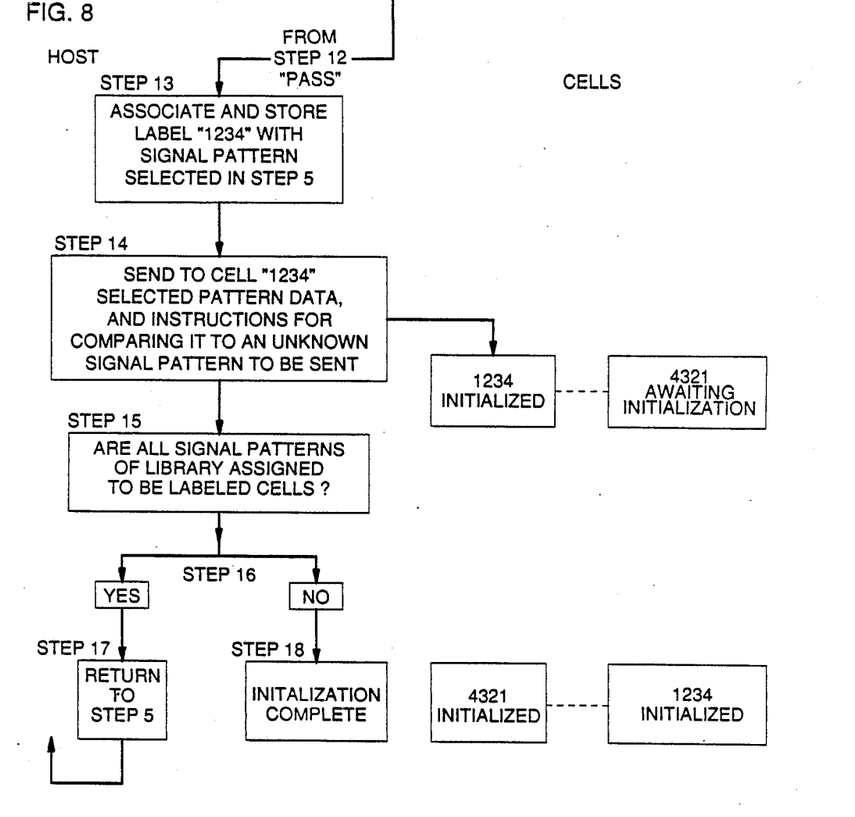
Figure 9:
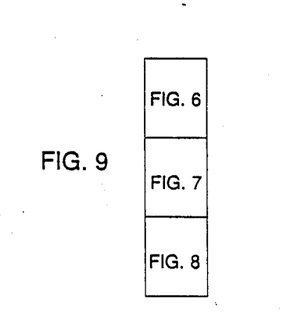

An alternative physical arrangement for practicing the invention is depicted in FIGS. 3, 4, and 5. Optical transmission media distribute and contain the signals. The signal controller 20 of this embodiment may also be an AT&T DSP32C microprocessor. The communications media are conventional. Processor 20 transmits and receives electrical digital signals to and from a first electrooptical signal converter 25. Connected to converter 25 is an optical coupler 30, which splits the optical signal output of converter 25 into a large number (for example, 100) of independent signal channels 31. Each channel 31 transmits the optical signal to a second electro-optic converter 25 associated with each cell 10, to provide an electrical digital signal for processing in the cell.

Various specific devices may be used to construct the general circuit arrangements depicted in FIG. 3. For example, the transmit capability of the converter 25, shown in FIG. 4, may be realized with a multiplexer 26 and a light-wave transmitter 27. Multiplexer 26 may be a commercially available conventional Signetics code 100164 device. This device processes a 16 bit, 20 Hz. electrical signal. The output of multiplexer 26 is an electrical signal of 320 Mbits/sec. This signal is fed to light-wave transmitter 27, which may for example be an AT&T model 1206 transmitter having an optical signal of a power of about 2.5 mw, at wavelength of 1.3 $\mu$m.

The receive capability of coupler 25 is supplied by an optical receiver element 35, which can be, for example, an Astrotech code 1306AA device. Receiver 35 receives an optical signal at about 0.7 uw power, and supplies an electrical output signal of 320 mbit/sec. to clock recovery unit 36.

Unit 36 may be a Gigabit Logic, Inc. device code 16G040LCX element. The output of clock recovery unit 36 is supplied to demultiplexer 37. The output of demultiplexer 37 is fed to two additional demultiplexers 38, 39. The outputs of demultiplexers 38, 39 are supplied to processor 20.

The communications protocols which help realize the invention through the above-described conventional media, as well as other aspects of the present invention, are next presented.

FUNCTIONAL DESCRIPTION OF THE PROCESS

Parallel computers designed to perform pattern recognition through association with a library of patterns or sub-patterns within its distributed memories, conduct processes in repetitive steps. In a conventional and typical "Broadcast" operation from a Host computer, each of the parallel processors is first imparted knowledge of a unique individual signal pattern. Each is then furnished with information of an unknown signal pattern, with instructions for comparing it to the unique pattern in its memory; this is the "Match" operation. When all comparisons are made, a small subset of the processors will contain the closest match to the unknown signal pattern; this is the "Resolve" operation. In a "Report" operation, the associated information such as labels, definitions, etc. of only a processor which has the closest match to the unknown pattern, is transmitted to the Host.

Persons skilled in the art of automated spoken word recognition will readily apply to the instant invention the presently available algorithmic processes for segmenting speech into multiplicities of known patterns, and then comparing an unknown speech pattern to these through the parallel processes described above. The algorithms will not be dealt with, since they are not necessary to describe the practice of the present invention.

To carry out the operations of Broadcast, Resolve, Report, using the present invention, each cell is first given an individuality. This may be done, for example, by creating or storing in a register portion of each cell's processor 1, a different digital word, which becomes the cell's call sign or label.

The call sign may be embedded at the time of manufacture. However, the invention provides the flexibility to perform the labeling as part of the initialization process.

The process of initialization may be considered as a "training" of the cells and an establishing of their relationship to the Host. Importantly, for most applications, the Host does not have to retain a mapping of the cell labels or data content, once the training has been completed.

One method for imparting individuality to the cells is to include a random number generator in the cell. During the initialization process, each cell is caused to generate a random number within a set range. If the computing assembly contains N cells, then a range of random numbers 1 through M is selected such that the probability of picking identical identifier numbers, is small. A physical device, such as a Shottkey diode may be associated in conventional manner with each cell to generate the random noise when activated in the initialization step.

Several values of the random noise, separated by sufficient time as to be uncorrelated, are sampled by each cell. The sample values can then be combined by concatenation.

Once a cell is labeled with its unique value call sign, the Host 6 compiles a listing of all cells 10 and their labels. The Host queries the individual cells to extract their respective call sign information. One advantageous approach to compiling the label list is to: (1) iteratively broadcast from the Host the value of a first call sign; i.e., a random number from the set of random numbers generated in the cells; (2) broadcast a command to all the cells to match the just-broadcast label against their individual label; (3) broadcast a command to all cells that any cell which registered a match as a result of step (2) shall broadcast its label match to the Host, thereby identifying the answering cell with a label. The initialization process will be more fully described next, using the illustrative process depicted in FIGS. 6–9.

With the cells arrayed as earlier described, the Host issues a command for all cells to turn on. The maximum number of cells in the array are assumed to be known.

Accordingly, the Host broadcasts an instruction to each cell to generate a random number within a range related to the cell count, and to store the number. Concurrently, the Host lists in its memory the set of numbers represented in the range of random numbers generated. The Host also prepares for transmission to a labeled cell, data representing a first signal pattern from the Host library of known signal patterns, together with signal pattern comparison instructions as earlier described.

Next, the Host selects one of the random numbers it has listed, in the illustrated example, the number "1234". The Host transmits that number to each cell, instructing each cell to search its store for a match to the just-broadcast number. For the cell which registers a match, the Host instructs that cell to trasmit back to the Host the random number. In the example, one of the cells 10 has generated the number "1234"; and accordingly, that number is selected as that cell's label.

Provision is made for cases where no match is registered, as follows. If no cell responds with the current label, the Host proceeds to broadcast the next label, or the next thereafter until a match is registered. If more than one response is received by the Host, indicating that, fortuitously, the same random number was generated by more than one cell, several strategies can be invoked. First, since this is a low probability event, the system or just the affected cells can be rebooted; that is, recycled to transmit anew the command to the cells to generate a new set of random numbers. Alternatively, the cells beyond the first to respond can be turned off, or all cells claiming the same label can be allowed to operate redundantly.

Pursuant to an important aspect of the invention, at the initialization stage, the cells with faults may be detected. When a given cell responds to the Host with a call sign matching the just-broadcast call sign, the Host issues a command for the cell to participate in a functionality test. One such test, for example, is to broadcast to the cell the data representing the selected first-known signal pattern and the signal pattern comparison instructions, with a command for the cell to perform a test pattern match and transmit results back to the Host. If the test pattern match meets pre-selected conventional test performance criteria, the cell "passes" and is initialized; i.e., is ready to receive data on unknown signal patterns. If not, the Host deletes from its random number list the random number associated with the failed cell and selects a new random number for the cell array to search out.

The Host repeats the procedure by broadcasting the next call sign, receiving the response from a cell having a matching call sign (or not receiving any response), and downloading to that cell data and instructions for processing. The initialization procedure is continued until all of the data and instruction sets necessary to the application have been stored in the cells of the computing assembly. Through the labeling of the cells, the Host can match a cell label with a known signal pattern.

Figure 10:
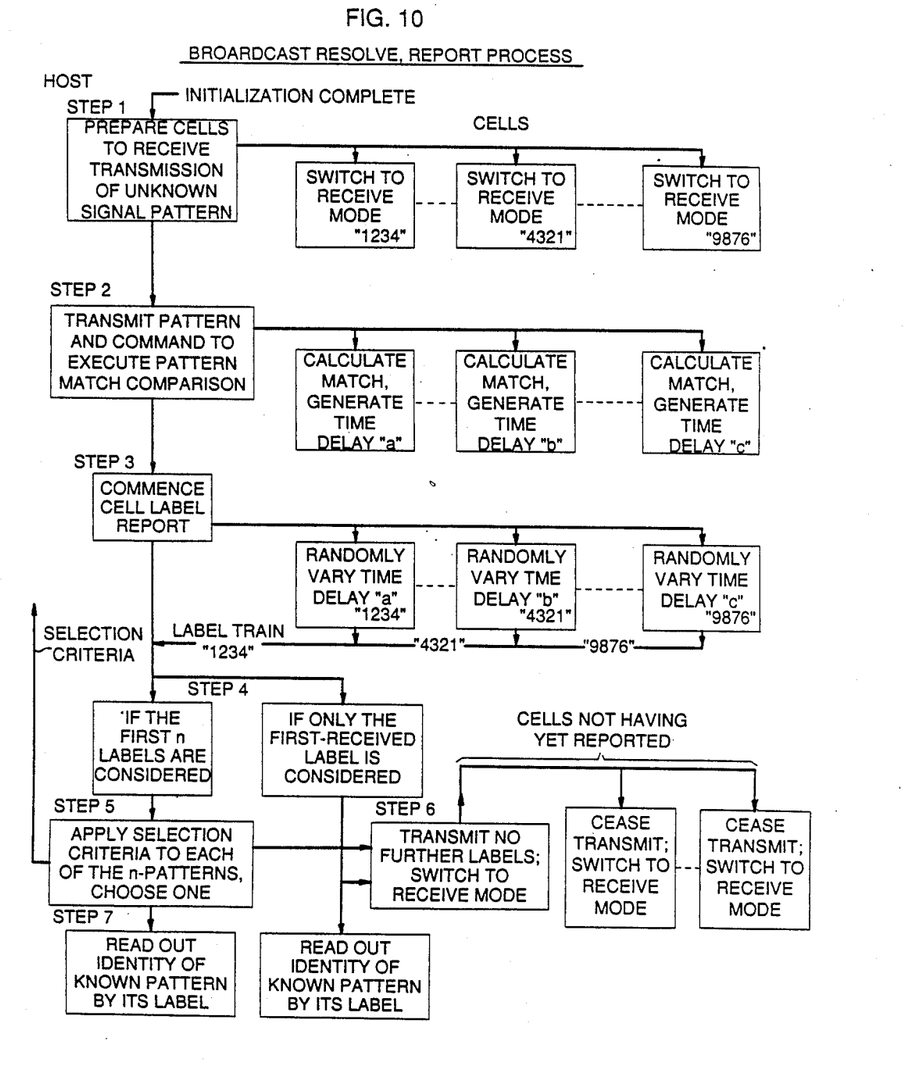

With the cells individually labeled and programmed, the Host executes a "Broadcast, Match, Resolve, Report" process which results in a determination of the best matches to the known reference patterns of a series of unknown signal patterns, in the manner next described and illustrated in FIG. 10.

Since in pattern recognition applications, it typically is only necessary to identify which one of the different known patterns of the reference library exhibits the highest correlation to the unknown just-broadcast pattern, it is sufficient for that cell with the highest correlation coefficient, or similarity measure, to communicate back to the Host. In the present invention, that cell need only transmit its call sign or label, because the Host contains the information connecting the different labels with individual known speech patterns.

Pursuant to another aspect of the invention, the reporting instruction set transmitted to each cell contains a command directing each cell to delay its report response by a time inversely proportional to the value of the similarity measure; and a further instruction to discontinue the report transmission upon command from the Host.

The Host accordingly broadcasts an unknown pattern to all the cells, with an instruction that each cell compute the similarity measure between the just-broadcast pattern and the individual pattern previously stored in each cell. In response, each cell 10 in the array generates a similarity measure as well as a transmit time delay factor, denoted "a", "b", "c" in FIG. 10, which are assumed to be in order of decreasing known-to-unknown pattern similarity. Next, the Host issues a command for all cells to report their labels.

It may be acceptable to assume that only one best match exists, namely, the first-transmitted label. In such case, following receipt of the first-transmitted label, the Host instructs all cells to cease their planned transmissions and revert to their "ready to receive" mode. This option is depicted in FIG. 10.

However, for some pattern recognition applications, it may be desirable for the Host to learn the identities of the n- cells which calculated the n-closest matches to the unknown signal pattern. A second report-receive option, therefore, is to instruct the Host to receive a serial string of the first n number of reports from the cells, at the completion of which the Host instructs all cells to cease and revert, as in the preceding paragraph.

Although the resolution of the best of several high-match reports is outside the scope of the present invention, a variety of conventional criteria may then be applied by the Host to determine which of the reports shall be regarded as the closest match. For example, the Host might be adapted to select a particular one of the patterns as best match in a given case because considerations of syntax suggest that pattern has a relatively high probability of being correct.

Ambiguity created by dead ties may also be resolved. No two cells, which happen to calculate identically the same numerical measure of similarity, are able to "know" they are tied, since the cells do not communicate amongst themselves. However, the labels of cells involved in two- or three-way ties can still be communicated to the Host. For example, the Report instruction set from the Host to each cell may be designed to include a command which randomly varies the previously-described transmission delay which each cell develops, but by an amount that is relatively small compared to the time-delay factors "a", "b", "c".

Thus, if the time delay factors are numerically the same, dead ties may still be reported at different times. Using this process, the Host may, for example, receive the first three or so transmissions, as represented by the label "train" of FIG. 10, step 3; and make determinations as to which label to regard as the best match. For example, the Host may, if the application allows, arbitrarily select the tie-breaker, or the Host may choose as the winning score that label having the greatest similarity to the winning measure of the next-earlier Broadcast-Resolve-Report operation.

In any case, following its determination of the best match, the Host signals the remaining cells to transmit no further responses.

The spirit of the invention is contained in the scope of the claims to follow.

What is claimed is:

1. Apparatus for controlling interactive processes between a Host machine linked through communications media with a plurality of separate processor elements, comprising:

means in each said element responsive to a signal from said Host for generating a label value unique to each individual element;

means in said Host for generating each of said unique label values;

means in said Host for associating with each said Host-generated unique label value a packet comprising data and an instruction set;

means for determining the existence, within the array of said elements, of a discrete element-generated label value which matches a one of said Host-generated label values; and means responsive to said determination for transmitting said packet to the element with said discrete label value.

2. Apparatus in accordance with claim 1, further comprising:

means in each said element responsive to information contained in each said instruction set for generating a response to said Host following receipt of said packet.

3. Apparatus for controlling parallel interactive processes between a Host machine and a plurality of separate processor elements, comprising:

direct broadcast communications channels between said Host and each said element;

means in each said element responsive to a broadcast signal from said Host for generating a label value unique to each individual element;

means in said Host for generating each of said unique label values;

means in said Host for associating with each said Host-generated unique label value a data and instruction packet, said packet comprising data representative of a reference signal pattern plus an instruction set to compare said reference pattern to data representative of an unknown signal pattern;

means for determining the existence, within the array of said elements, of a discrete element-generated label value which matches a one of said Host-generated label values; and means responsive to said determination for transmitting to the element with said discrete label value said packet and said unknown signal pattern data.

4. Apparatus in accordance with claim 3, further comprising:

means in each said element responsive to information contained in each said instruction set for generating a measure of the degree of similarity between said reference pattern and said unknown pattern.

5. Apparatus in accordance with claim 4, further comprising: means for broadcasting to said Host the label-value of the element which generated the highest-valued said measure.

6. Apparatus in accordance with claim 5, further comprising:

means for inhibiting the transmission of the label values of all said elements which generated measures which were less in value than said highest-valued measure.

7. Apparatus in accordance with claim 6, wherein said label value generating means in each said element comprises a random number generator.

8. Apparatus in accordance with claim 7, wherein said elements are arrayed randomly with respect to each other, and without element-to-element direct interconnection.

9. Apparatus in accordance with claims 1 or 3, further including:

means in each element for detecting presence in said element of any faults within a preselected fault set;

means for communicating the detection of a said fault to said Host; and means responsive to said fault detection for bypassing the transmission of data and instruction sets to said faulted element.

* * * * *